United States Patent
Zhou

(10) Patent No.: US 11,656,843 B2
(45) Date of Patent: *May 23, 2023

(54) METHOD FOR QUICKLY STARTING APPLICATION SERVICE, AND TERMINAL

(71) Applicant: Honor Device Co., Ltd., Shenzhen (CN)

(72) Inventor: Junyang Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,977

(22) Filed: Nov. 30, 2020

(65) Prior Publication Data

US 2021/0081167 A1    Mar. 18, 2021

Related U.S. Application Data

(63) Continuation of application No. 14/829,817, filed on Aug. 19, 2015, now Pat. No. 10,853,028, which is a
(Continued)

(51) Int. Cl.
*H04M 1/67* (2006.01)
*G06F 3/16* (2006.01)
(Continued)

(52) U.S. Cl.
CPC ............ *G06F 3/167* (2013.01); *G06F 9/445* (2013.01); *H04M 1/271* (2013.01); *G06F 3/048* (2013.01);
(Continued)

(58) Field of Classification Search
None
See application file for complete search history.

(56) References Cited

U.S. PATENT DOCUMENTS

| 7,689,939 | B1 | 3/2010 | Becker |
| 2006/0080097 | A1 | 4/2006 | Hoffmann |

(Continued)

FOREIGN PATENT DOCUMENTS

| CN | 102693085 A | 9/2012 |
| CN | 102880414 A | 1/2013 |

(Continued)

OTHER PUBLICATIONS

Nelson Aguilar How to Bypass an iPhine's Lock Screen Using Siri in iOS 7.02 to Send Messages (youtube) Oct. 1, 2013 https://ios.gadgethacks.com/how-to/passcode-exploit-bypass-iphones-lock-screen-using-siri-ios-7-0-2-send-messages-0148844/ (Year: 2013).*

(Continued)

*Primary Examiner* — Xuyang Xia
(74) *Attorney, Agent, or Firm* — Conley Rose, P.C.

(57) ABSTRACT

A method for quickly starting an application service, and a terminal. The method includes acquiring, by a terminal, event trigger information; starting, by the terminal, the application service software after determining that the event trigger information meets a preset quick startup condition; and acquiring, by the terminal, a voice instruction input by a user, and running the application service software according to the voice instruction. According to the method provided in the embodiments of the present disclosure, application service software is started by using event trigger information, so that a background of a terminal starts to perform recording only after the application service software is started, and background recording is stopped after the terminal provides an application service for a user, preventing a recording device in the background of the terminal from being always in a recording state, and further reducing power consumption of the terminal.

20 Claims, 5 Drawing Sheets

Related U.S. Application Data continuation of application No. PCT/CN2014/079660, filed on Jun. 11, 2014.

(51) Int. Cl.
*H04M 1/27* (2006.01)
*G06F 9/445* (2018.01)
*G06F 9/451* (2018.01)
*G06F 3/048* (2013.01)
*H04M 1/72454* (2021.01)
*H04M 1/72466* (2021.01)

(52) U.S. Cl.
CPC ............... *G06F 9/451* (2018.02); *H04M 1/67* (2013.01); *H04M 1/72454* (2021.01); *H04M 1/72466* (2021.01); *H04M 2250/74* (2013.01); *Y02D 10/00* (2018.01); *Y02D 30/70* (2020.08)

(56) References Cited

U.S. PATENT DOCUMENTS

| | | | |
|---|---|---|---|
| 2009/0124239 A1 | 5/2009 | Tsuei | |
| 2009/0254351 A1 | 10/2009 | Shin et al. | |
| 2011/0105193 A1* | 5/2011 | Lee | G06F 3/0484 345/173 |
| 2013/0135235 A1 | 5/2013 | Noutomi | |
| 2013/0179784 A1 | 7/2013 | Bang | |
| 2013/0283199 A1 | 10/2013 | Selig et al. | |
| 2014/0038557 A1 | 2/2014 | Kim et al. | |
| 2014/0057610 A1* | 2/2014 | Olincy | H04W 4/16 455/414.1 |
| 2014/0078091 A1 | 3/2014 | Lu et al. | |
| 2014/0145927 A1 | 5/2014 | Chang et al. | |
| 2014/0156269 A1 | 6/2014 | Lee et al. | |
| 2014/0168117 A1* | 6/2014 | Kim | H04M 1/6505 345/173 |
| 2014/0210754 A1 | 7/2014 | Ryu et al. | |
| 2014/0281962 A1 | 9/2014 | Won | |
| 2014/0310643 A1* | 10/2014 | Karmanenko | G06F 1/1626 455/566 |
| 2015/0040012 A1 | 2/2015 | Faaborg et al. | |
| 2016/0309013 A1 | 10/2016 | Zhu | |

FOREIGN PATENT DOCUMENTS

| | | | |
|---|---|---|---|
| CN | 103369143 A | * | 10/2013 |
| CN | 103369143 A | | 10/2013 |
| CN | 103760969 A | | 4/2014 |
| EP | 1107545 A1 | | 6/2001 |
| EP | 1263199 A2 | | 12/2002 |
| EP | 1610534 A1 | | 12/2005 |
| EP | 2109298 A1 | | 10/2009 |
| EP | 2506609 A1 | | 10/2012 |
| EP | 2632129 A1 | | 8/2013 |
| GB | 2346045 A | | 7/2000 |
| WO | 03075585 A1 | | 9/2003 |
| WO | 2013125916 A1 | | 8/2013 |
| WO | WO-2013152665 A1 | * | 10/2013 ........... G06F 3/0482 |

OTHER PUBLICATIONS

"Bypass iPhone Lock Screen Using Siri in iOS 7.0.2 to Send Messages [How-To]," http://www.youtube.com/watch?v=GodXEfDzs5U, 2013.

"How to Bypass an iPhone's Lock Screen Using Siri in iOS 7.0.2 to Send Messages (Nelson Aguilar) which is the full version of the above Video," https://ios.gadgethacks.com/how-to/passcode-exploit -bypass-iphones-lock-screen-using-siri-ios-7-0-2-send-messages-0148844/, 2013.

* cited by examiner

METHOD FOR QUICKLY STARTING APPLICATION SERVICE, AND TERMINAL

CROSS-REFERENCE TO RELATED APPLICATIONS

This application is a continuation of U.S. patent application Ser. No. 14/829,817 filed on Aug. 19, 2015, which is a continuation of International Patent Application No. PCT/CN2014/079660 filed on Jun. 11, 2014. All of the aforementioned applications are hereby incorporated by reference in their entireties.

TECHNICAL FIELD

The present disclosure relates to communications technologies, and in particular, to a method for quickly starting an application service, and a terminal.

BACKGROUND

Currently, a smartphone becomes an important communication tool in people's life, and quickly making a call anytime anywhere is a basic appeal of person-to-person communication. Currently, for making a call by using a smartphone, the steps usually include selecting a dial-up tool, inputting a number in a dial-up interface, tapping a call button, and then calling out. In addition, the dial-up interface is usually combined with an address book. A user may also select a contact from the address book, enter a details interface of the contact, and then tap a dial-up button to call out. A button-pressing operation of at least three steps is required in this dial-up process. If the smartphone is in a screen-off state or a standby state (and a screen lock is set for the mobile phone), for making a call, the steps further include lighting up a screen and unlocking the screen. However, because of a limitation of a battery life, a smartphone is in a standby or screen-off state for most time. In this case, if the user needs to make a call, a button-pressing operation with at least five steps is required. Therefore, current steps for making a call by using a smartphone are relatively complex and not user-friendly. Therefore, a realistic user demand to be urgently resolved is to implement quickly making of a call on a smartphone by a user by performing fewer button-pressing operations.

To enable a user to quickly make a call on a smartphone, in the prior art, a voice of the user is converted into a text by an application, such as a voice assistant, on the smartphone and by using a speech recognition technology, so as to become an instruction of a smartphone system, that is, a call can be made by means of voice input.

However, in the prior art, for starting a voice application, a microphone (Mic) needs to be occupied for recording, and if the voice application is used in the case of screen-off, a recording device in a background needs to perform recording for a long time, and an application processor (AP) cannot be on standby for a long time, thereby increasing power consumption of a smartphone and affecting a battery life of the smartphone.

SUMMARY

A method for quickly starting an application service, and a terminal that are provided in embodiments of the present disclosure are used to resolve a technical problem in the prior art that power consumption of a terminal is relatively large because a recording device in a background performs recording for a long time.

According to a first aspect, an embodiment of the present disclosure provides a method for quickly starting an application service, including acquiring, by a terminal, event trigger information, where the event trigger information is used to start application service software on the terminal; starting, by the terminal, the application service software after determining that the event trigger information meets a preset quick startup condition; and acquiring, by the terminal, a voice instruction input by a user, and running the application service software according to the voice instruction.

With reference to the first aspect, in a first possible implementation manner of the first aspect, the application service software is dial-up application software, and the acquiring, by a terminal, event trigger information includes acquiring, by the terminal, the event trigger information, where the event trigger information is used to start the dial-up application software; and the acquiring, by the terminal, a voice instruction input by a user, and running the application service software according to the voice instruction includes acquiring, by the terminal, the voice instruction input by the user, and running the dial-up application software according to the voice instruction.

With reference to the first aspect or the first possible implementation manner of the first aspect, in a second possible implementation manner of the first aspect, the acquiring, by a terminal, event trigger information includes acquiring, by the terminal, the event trigger information in a black screen state; and the acquiring, by the terminal, a voice instruction input by a user, and running the application service software according to the voice instruction includes acquiring, by the terminal in the black screen state, the voice instruction input by the user, and running the application service software according to the voice instruction.

With reference to any one of the first aspect to the second possible implementation manner of the first aspect, in a third possible implementation manner of the first aspect, the acquiring, by a terminal, event trigger information includes receiving, by the terminal, a button startup event that is input by the user by performing an operation on a physical button; and acquiring, by the terminal, the event trigger information according to the button startup event.

With reference to the third possible implementation manner of the first aspect, in a fourth possible implementation manner of the first aspect, the starting, by the terminal, the application service software after determining that the event trigger information meets a quick startup condition includes determining, by the terminal, whether a trigger time of the button startup event is greater than a preset threshold; and if yes, starting, by the terminal, the application service software.

With reference to any one of the first aspect to the second possible implementation manner of the first aspect, in a fifth possible implementation manner of the first aspect, the acquiring, by a terminal, event trigger information includes receiving, by the terminal, a sensor startup event input by the user; and acquiring, by the terminal, the event trigger information according to the sensor startup event.

With reference to the fifth possible implementation manner of the first aspect, in a sixth possible implementation manner of the first aspect, the starting, by the terminal, the application service software after determining that the event trigger information meets a quick startup condition includes determining, by the terminal, whether the event trigger information matches event information in a preset event information set of the terminal; and if the event trigger information matches the event information in the preset event information set of the terminal, starting, by the terminal, the application service software.

According to a second aspect, an embodiment of the present disclosure provides a terminal, including an acquiring module configured to acquire event trigger information, where the event trigger information is used to start application service software on the terminal; a determining and startup module configured to start the application service software after it is determined that the event trigger information meets a preset quick startup condition; and a running module configured to acquire a voice instruction input by a user, and run the application service software according to the voice instruction.

With reference to the second aspect, in a first possible implementation manner of the second aspect, the application service software is dial-up application software, the acquiring module is configured to acquire the event trigger information, and the event trigger information is used to start the dial-up application software; and the running module is configured to acquire the voice instruction input by the user, and run the dial-up application software according to the voice instruction.

With reference to the second aspect or the first possible implementation manner of the second aspect, in a second possible implementation manner of the second aspect, the acquiring module is configured to acquire the event trigger information in a black screen state; and the running module is configured to acquire, in the black screen state, the voice instruction input by the user, and run the application service software according to the voice instruction.

With reference to any one of the second aspect to the second possible implementation manner of the second aspect, in a third possible implementation manner of the second aspect, the acquiring module includes a first receiving unit configured to receive a button startup event that is input by the user by performing an operation on a physical button; and a first acquiring unit configured to acquire the event trigger information according to the button startup event.

With reference to the third possible implementation manner of the second aspect, in a fourth possible implementation manner of the second aspect, the determining and startup module includes a first determining unit configured to determine whether a trigger time of the button startup event is greater than a preset threshold; and a first startup unit configured to when the first determining unit determines that the trigger time of the button startup event is greater than the preset threshold, start the application service software.

With reference to any one of the second aspect to the second possible implementation manner of the second aspect, in a fifth possible implementation manner of the second aspect, the acquiring module further includes a second receiving unit configured to receive a sensor startup event input by the user; and a second acquiring unit configured to acquire the event trigger information according to the sensor startup event.

With reference to the fifth possible implementation manner of the second aspect, in a sixth possible implementation manner of the second aspect, the determining and startup module further includes a second determining unit configured to determine whether the event trigger information matches event information in a preset event information set of the terminal; and a second startup unit configured to start the application service software when the second determining unit determines that the event trigger information matches the event information in the preset event information set of the terminal.

According to a third aspect, an embodiment of the present disclosure provides a terminal, including an input device configured to acquire event trigger information, where the event trigger information is used to start application service software on the terminal; and configured to acquire a voice instruction input by a user; and a processor configured to start the application service software after it is determined that the event trigger information meets a preset quick startup condition, and run the application service software according to the voice instruction acquired by the input device.

With reference to the third aspect, in a first possible implementation manner of the third aspect, the application service software is dial-up application software, the input device is configured to acquire the event trigger information, the event trigger information is used to start the dial-up application software, and the input device is further configured to acquire the voice instruction input by the user; and the processor is configured to run the dial-up application software according to the voice instruction after the input device acquires the voice instruction input by the user.

With reference to the third aspect or the first possible implementation manner of the third aspect, in a second possible implementation manner of the third aspect, the terminal further includes a display screen, and the input device is configured to acquire the event trigger information in a black screen state of the display screen, and configured to acquire, in the black screen state of the display screen, the voice instruction input by the user; and the processor is configured to run the application service software according to the voice instruction acquired by the input device.

With reference to any one of the third aspect to the second possible implementation manner of the third aspect, in a third possible implementation manner of the third aspect, the input device is configured to receive a button startup event that is input by the user by performing an operation on a physical button, and acquire the event trigger information according to the button startup event.

With reference to the third possible implementation manner of the third aspect, in a fourth possible implementation manner of the third aspect, the processor is configured to determine whether a trigger time of the button startup event is greater than a preset threshold, and if yes, start the application service software.

With reference to any one of the third aspect to the second possible implementation manner of the third aspect, in a fifth possible implementation manner of the third aspect, the terminal further includes a sensor, and the input device is configured to receive a sensor startup event that is input by the user by using the sensor, and acquire the event trigger information according to the sensor startup event.

With reference to the fifth possible implementation manner of the third aspect, in a sixth possible implementation manner of the third aspect, the processor is configured to determine whether the event trigger information matches event information in a preset event information set of the terminal, and if the event trigger information matches the event information in the preset event information set of the terminal, start the application service software.

According to the method for quickly starting an application service, and the terminal that are provided in the embodiments of the present disclosure, the terminal acquires event trigger information, and starts application service software after determining that the event trigger information meets a preset quick startup condition, so as to provide a corresponding application service for a user. According to the method provided in the embodiments of the present disclosure, application service software is started by using event trigger information, so that a background of a terminal starts to perform recording only after the application service software is started, and background recording is stopped after the terminal provides an application service for a user, preventing a recording device in the background of the terminal from being always in a recording state, and further reducing power consumption of the terminal.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
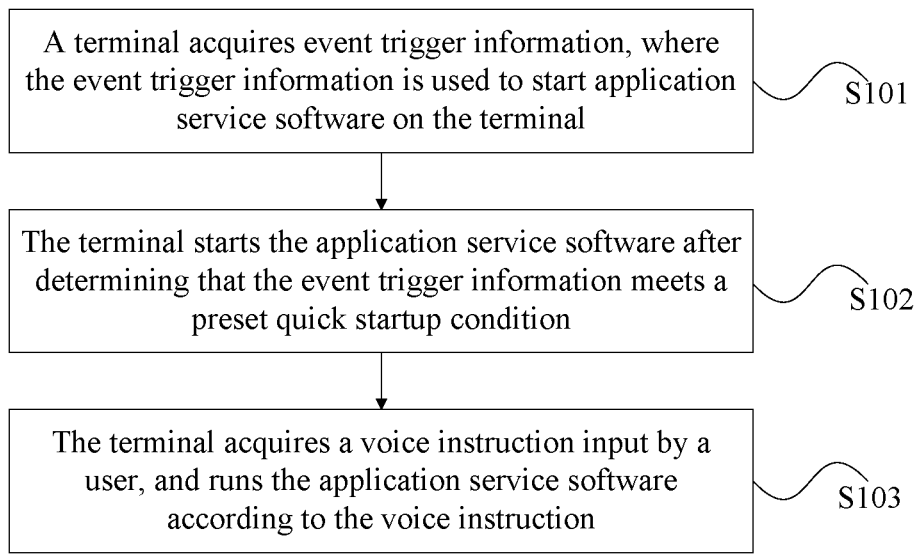
FIG. 1 is a schematic flowchart of Embodiment 1 of a method for quickly starting an application service according to the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by persons of ordinary skill in the art based on the embodiments of the present disclosure without creative efforts shall fall within the protection scope of the present disclosure.

A terminal, namely, a user equipment, in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent, a user device, or a user equipment.

The technical solutions of the present disclosure may be applicable to any scenario in which a terminal is in a screen-on state, a black screen state with a running AP, and a black screen state with a standby AP. A black screen refers to a screen-off state, that is, a state in which a screen of the terminal is powered off. Further, in the embodiments of the present disclosure, the black screen may further include a screen locked state that is presented after the screen is lighted up in the screen-off state, that is, an initial status of the terminal is the screen-off state, and after a user lights up the screen, the terminal is presented in a screen locked state. The state of black screen with a running AP refers to a state in which the terminal is in the screen-off state, but some applications in a background still run. For example, when the screen of the terminal is off, some instant messaging software (such as WeChat) still runs in the background; in this case, the AP is in a running state. The state of black screen with a standby AP refers to a state in which the terminal is in the screen-off state, and no application runs in the background.

FIG. 1 is a schematic flowchart of Embodiment 1 of a method for quickly starting an application service according to the present disclosure. As shown in FIG. 1, the method may include the following steps.

S101. A terminal acquires event trigger information, where the event trigger information is used to start application service software on the terminal. When a user needs to quickly start an application service on the terminal, the user may perform a related trigger operation on the terminal, so that a processing chip inside the terminal can acquire the event trigger information according to the trigger operation of the user, and report the event trigger information to an operating system of the terminal. Optionally, a related event triggered by the user on the terminal may be a button event (pressing a button only once), and may be a sensor sensing event, such as a gravity sensing event or a speed sensing event. For example, when the user holds down a physical button of a smartphone, the smartphone responds to a button event of the user, that is, converts the button event into event trigger information (the event trigger information may include a signal, data, and the like after conversion), and reports the event trigger information to an operating system of the smartphone.

S102. The terminal starts the application service software after determining that the event trigger information meets a preset quick startup condition. After acquiring the event trigger information, the operating system of the terminal performs encapsulation and classification processing on the event trigger information, that is, the operating system of the terminal determines a type of the event trigger information, determines, according to the type of the event trigger information, a quick startup condition corresponding to the event trigger information, and then determines whether the event trigger information meets the determined quick startup condition. Optionally, the quick startup condition may be determining whether a time of acquiring the event trigger information exceeds a preset time threshold, or may be determining whether the type of the event trigger information matches information preset in the terminal, or may further be whether content included in the event trigger information is the same as information preset in the terminal, or may further be another determining condition. If a result of the determining is that the event trigger information meets the quick startup condition, the terminal starts corresponding application service software. Optionally, performing a different trigger operation by the user can enable the terminal to acquire different event trigger information, and different event trigger information is corresponding to different application service software. For example, if the user currently wants to start a voice service, when the user holds down a physical button (such as a volume down button) on the terminal, the event trigger information obtained by the terminal is information about voice service software. That is, a trigger operation performed by the user, event trigger information acquired by the terminal according to the trigger operation performed by the user, and an application service software that needs to be started are corresponding to one another. Optionally, the application service software may be voice dial-up software, and may be instant messaging software such as WeChat, QQ electronic mail, or a short messaging service.

S103. The terminal acquires a voice instruction input by a user, and runs the application service software according to the voice instruction. After starting the application service software, the terminal may receive voice input of the user. Accordingly, a recording device in a background starts recording at this time. Optionally, after starting the application service software, the terminal may notify, in a manner of vibrating or playing an alert tone, the user that the voice instruction can be currently input. After receiving the voice instruction input by the user, the terminal runs the application service software according to the voice instruction input by the user, so as to provide a corresponding application service for the user. For example, when the user needs to make a call to "XXX", the user may input "call XXX" by means of voice. In this case, after recording the voice instruction, the recording device in the background of the terminal triggers the voice service software to respond to the voice instruction input by the user, that is, a speech recognition system in the terminal converts the received voice instruction into a text instruction, and then acquires call information (that is, application service information) according to the text instructions. For example, if the voice instruction is "call XXX", the application service information acquired by the terminal is a number of XXX. After the terminal obtains the call information, a quick call system in the terminal starts a call service.

In the prior art, when a terminal is in a black screen state with a running AP, and when the terminal needs to provide an application service for a user, application service software is usually started by means of voice wake-up, so that the terminal provides a corresponding application service. In this case, a recording device in a background of the terminal needs to be always in a recording state from the voice wake-up, and after the application service is provided for the user, the recording device in the background is still in the recording state, so as to be ready to receive voice instruction input of the user anytime. Therefore, power consumption of the terminal is relatively large because the background performs recording all the time. However, regardless of whether a terminal is in a black screen state with a running AP or a black screen state with a standby AP, in the present disclosure, application service software is started by using event trigger information on the terminal, a recording device in a background starts to run only after the application service software is started, so as to receive a voice instruction of a user, and after the terminal provides an application service for the user, the background stops recording. Therefore, power consumption brought by the recording device in the background is reduced. It should be noted that when a terminal is in a black screen state with a standby AP, and after a user performs a trigger operation on the terminal, the terminal needs to start the AP, and then can acquire event trigger information.

According to the method for quickly starting an application service provided in this embodiment of the present disclosure, a terminal acquires event trigger information, and starts application service software after determining that the event trigger information meets a preset quick startup condition, so as to provide a corresponding application service for a user. According to the method provided in this embodiment of the present disclosure, application service software is started by using event trigger information, so that a background of a terminal starts to perform recording only after the application service software is started, and background recording is stopped after the terminal provides an application service for a user, preventing a recording device in the background of the terminal from being always in a recording state, and further reducing power consumption of the terminal.

Figure 2:
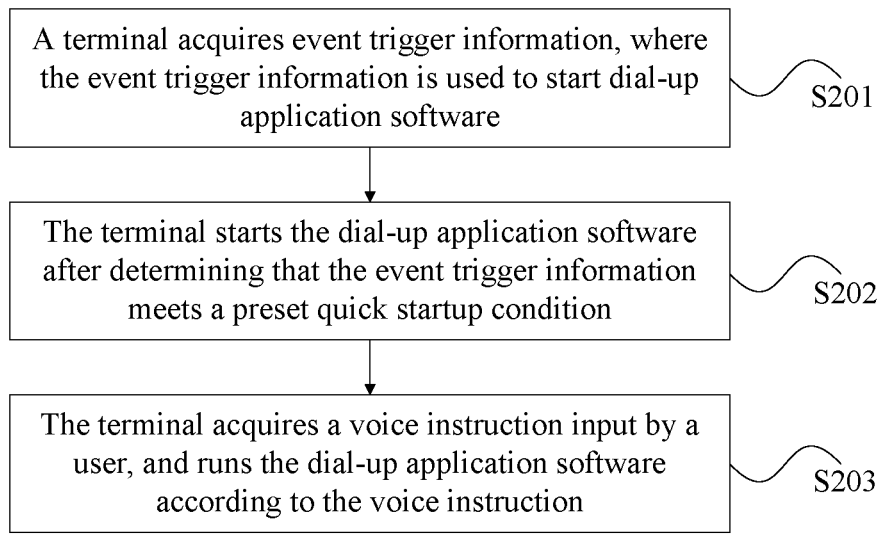
FIG. 2 is a schematic flowchart of Embodiment 2 of a method for quickly starting an application service according to the present disclosure.

FIG. 2 is a schematic flowchart of Embodiment 2 of a method for quickly starting an application service according to the present disclosure. The method involved in this embodiment is a process in which a call is quickly made on a terminal, that is, the application service software in the foregoing Embodiment 1 is dial-up application software. As shown in FIG. 2, the method may include the following steps.

S201. A terminal acquires event trigger information, where the event trigger information is used to start dial-up application software. When a user needs to quickly make a call on the terminal, the user may perform a related trigger operation on the terminal, so that a processing chip inside the terminal can acquire event trigger information according to the trigger operation of the user, and report the event trigger information to an operating system of the terminal. The event trigger information is used to start the dial-up application software, and the dial-up application software may be voice dial-up software. Optionally, the terminal may acquire the event trigger information in a screen-on state. Optionally, the terminal may acquire the event trigger information in a black screen state. For example, the terminal may acquire the event trigger information in a black screen state with a running AP, may further acquire the event trigger information in a black screen state with a standby AP, and may further acquire the event trigger information in a black screen state with the terminal having a secure screen lock. This embodiment of the present disclosure sets no limitation on a scenario in which the event trigger information is acquired.

S202. The terminal starts the dial-up application software after determining that the event trigger information meets a preset quick startup condition. After acquiring the event trigger information used to start the dial-up application software, the operating system of the terminal determines a type of the event trigger information, determines, according to the type of the event trigger information, a quick startup condition corresponding to the event trigger information, and then determines whether the event trigger information meets the determined quick startup condition. Optionally, the quick startup condition may be determining whether a time of acquiring the event trigger information exceeds a preset time threshold, or may be determining whether the type of the event trigger information matches information preset in the terminal, or may further be determining whether content included in the event trigger information is the same as information preset in the terminal, or may further be another determining condition. If a result of the determining is that the event trigger information meets the quick startup condition, the terminal starts the dial-up application software.

S203. The terminal acquires a voice instruction input by a user, and runs the dial-up application software according to the voice instruction. After starting the dial-up application software, the terminal may receive voice input of the user. Accordingly, a recording device in a background starts recording at this time. Optionally, after starting the dial-up application software, the terminal may notify, in a manner of vibrating or playing an alert tone, the user that the voice instruction can be currently input. After receiving the voice instruction input by the user, the terminal runs the dial-up application software according to the voice instruction input by the user. For example, when the user needs to make a call to "XXX", the user may input "call XXX" by means of voice. In this case, after recording the voice instruction, the recording device in the background of the terminal triggers the dial-up application software to respond to the voice instruction input by the user, that is, a speech recognition system in the terminal converts the received voice instruction into a text instruction, and then acquires call information (that is, application service information) according to the text instructions. For example, if the voice instruction is "call XXX", the application service information acquired by the terminal is a number of XXX. After the terminal obtains the call information, a quick call system in the terminal starts a call service. Optionally, the terminal may receive, in the case of screen-on, the voice instruction input by the user. Optionally, the terminal may further receive, in a black screen state, the voice instruction input by the user. For example, the terminal may receive, in a black screen state with a running AP, the voice instruction input by the user, may further receive, in a black screen state with a standby AP, the voice instruction input by the user, and may further receive, in a black screen state with the terminal having a secure screen lock, the voice instruction input by the user. This embodiment of the present disclosure sets no limitation on a scenario in which the voice instruction input by the user is received.

According to the method for quickly starting an application service provided in this embodiment of the present disclosure, a terminal acquires event trigger information, and starts dial-up application software after determining that the event trigger information meets a preset quick startup condition, so as to provide a corresponding application service for a user. According to the method provided in this embodiment of the present disclosure, dial-up application software is started by using event trigger information, so that a background of a terminal starts to perform recording only after the dial-up application software is started, and background recording is stopped after the terminal provides a dial-up service for a user, preventing a recording device in the background of the terminal from being always in a recording state, and further reducing power consumption of the terminal.

Figure 3:
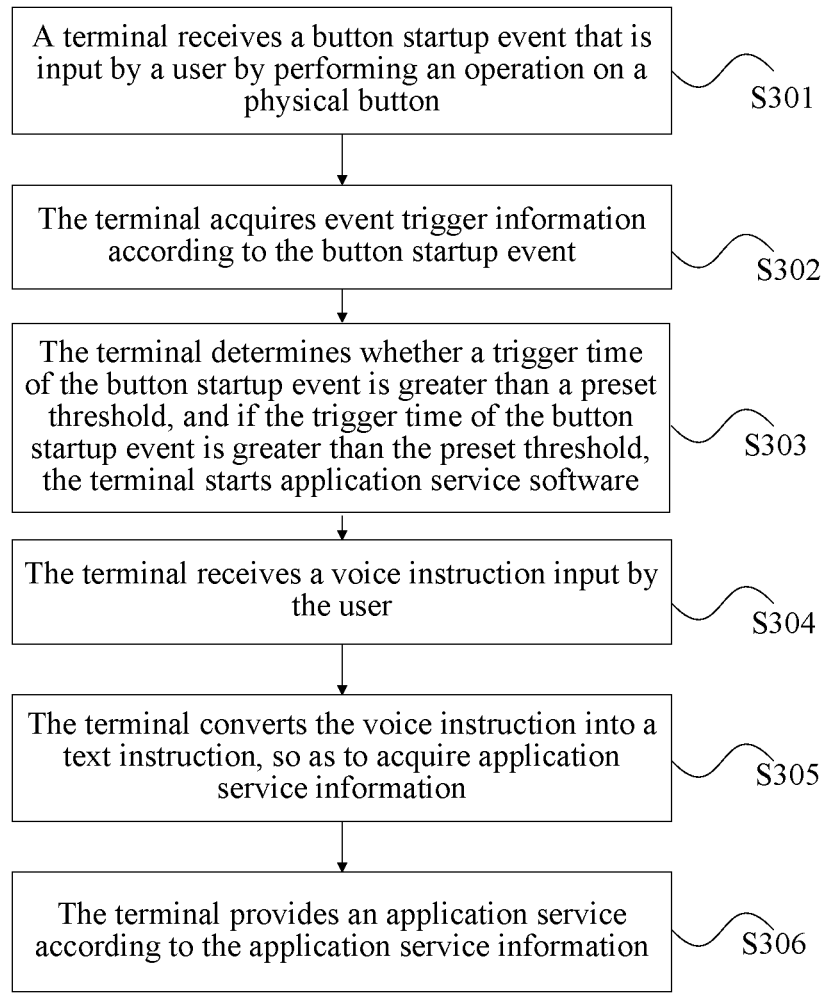
FIG. 3 is a schematic flowchart of Embodiment 3 of a method for quickly starting an application service according to the present disclosure.

FIG. 3 is a schematic flowchart of Embodiment 3 of a method for quickly starting an application service according to the present disclosure. This embodiment involves a process in which a user triggers, by using a button, a terminal to start an application service. As shown in FIG. 3, the method may include the following steps.

S301. A terminal receives a button startup event that is input by a user by performing an operation on a physical button. When the user needs to quickly start an application service on the terminal, the user may perform a button-pressing operation on the terminal, that is, the user may input the button startup event to the terminal by performing the button-pressing operation.

Optionally, the terminal receives the button startup event that is input by the user by performing an operation on the physical button once, that is, the button startup event is input by the user to the terminal by performing one button-pressing operation. For example, it is assumed that the terminal is a smartphone, the button startup event of the user may be startup by holding down a physical button of the terminal, such as startup by holding down a volume down button (Volume−), startup by holding down a volume up button (Volume+), startup by holding down a power button, or startup by holding down a shutter button of a mobile phone camera; may further be startup by holding down a Bluetooth headset button, such as startup by holding down a Bluetooth headset dial key, startup by holding down a Bluetooth headset volume down button, or startup by holding down a Bluetooth headset volume up button; and may further be startup by holding down a wired headset button, such as startup by holding down a wired headset volume down button, startup by holding down a wired headset volume up button, or startup by holding down a wired headset play button. Performing an operation on a physical button once by the user to input the button startup event is supported by the terminal, facilitating a user operation. In particular, in a screen-off or screen locked state of the terminal, supporting input of the button startup event by performing one operation improves manipulation efficiency.

Optionally, the terminal receives a button startup event that is input by the user by double-tapping a button or tapping a button.

S302. The terminal acquires the event trigger information according to the button startup event. It should be noted that when the terminal is in a black screen state with a running AP, the terminal may directly acquire the event trigger information according to the button startup event of the user. When the terminal is in a black screen state with a standby AP, after receiving the button startup event of the user, the terminal needs to power on the AP to activate the AP, and then can acquire the event trigger information according to the button startup event.

S303. The terminal determines whether a trigger time of the button startup event is greater than a preset threshold, and if yes, the terminal starts application service software. When the terminal is in the black screen state with a running AP, after acquiring the event trigger information, the terminal directly performs encapsulation and classification processing on the event trigger information. When the terminal is in the black screen state with a standby AP, the terminal needs to perform self-test and recovery on the AP after the AP is powered on, and the terminal performs encapsulation and classification processing on the acquired event trigger information only after it is detected that a status of the AP is normal.

Encapsulation and classification processing performed by the terminal on the event trigger information is determining a type of the event trigger information by the terminal. When the terminal determines that the type of the event trigger information is a button startup event, the terminal determines, according to the type of the event trigger information, that a quick startup condition corresponding to the event trigger information is whether a trigger time of the button startup event is greater than the preset threshold. For example, it is determined whether a time of pressing a button by the user is greater than a preset threshold. If the time of pressing a button by the user is greater than the preset threshold, the terminal starts the application service software. Optionally, when the user presses a different button, it indicates that the user needs to start different application service software. For example, if the user currently wants to start a voice service, when the user holds down a volume down button on the terminal, the event trigger information obtained by the terminal is information about voice service software. If the user currently wants to start a short messaging service, when the user holds down a volume up button on the terminal, the event trigger information obtained by the terminal is information about short messaging service software. That is, a button-pressing operation performed by the user, event trigger information acquired by the terminal according to the button-pressing operation performed by the user, and an application service software that needs to be started are corresponding to one another.

S304. The terminal receives the voice instruction input by the user. After starting the application service software, the terminal may receive voice input of the user. Accordingly, a recording device in a background starts recording at this time. Optionally, after starting the application service software, the terminal may notify, in a manner of vibrating or playing an alert tone, the user that the voice instruction can be currently input.

S305. The terminal converts the voice instruction into a text instruction, so as to acquire application service information. After receiving the voice instruction input by the user, the terminal converts the voice instruction into the text instruction according to the voice instruction input by the user, so as to acquire the application service information related to the voice instruction.

S306. The terminal provides the application service according to the application service information. In an implementation manner of this embodiment of the present disclosure, the terminal may perform an operation of quickly making a call. Optionally, the terminal is a mobile phone. Optionally, the terminal is in a black screen state with a running AP. Optionally, the terminal is in a screen locked state.

The user starts application service software by using a button on the smartphone, that is, the user performs one button-pressing operation on the smartphone, for example, holds down a volume down button, so as to input a button startup event to the smartphone. Related hardware of the smartphone responds to the button startup event of the user, which is represented as converting a button event of the user into event trigger information that includes information such as a signal and data, and reporting the event trigger information to an operating system of the smartphone. After receiving the event trigger information, the operating system of the smartphone performs encapsulation and classification processing on the event trigger information, that is, determines a quick startup condition corresponding to the event trigger information (that is, whether a time of holding down a button by the user is greater than a preset threshold), and starts voice service software after determining that the time of holding down a button by the user is greater than the preset threshold.

A device in a background of the smartphone starts to perform recording only after the smartphone starts the voice service software, so as to receive voice instruction input of the user. In this case, the voice service software may notify, in a manner of playing an alert tone or vibrating, the user that a voice instruction for making a call, such as "redial", "call XXX", or "make a call to XXX", can be input, where "XXX" is a name of a contact. A speech recognition system in the smartphone converts the received voice instruction into a text instruction, and then acquires application service information (that is, call information) according to the text instructions. For example, if the voice instruction is "redial", the application service information finally acquired by the smartphone is a call number last time; if the voice instruction is "call XXX", the application service information finally acquired by the smartphone is a number of XXX.

After the smartphone obtains the application service information, a quick call system of the smartphone starts a call service. In this case, the smartphone automatically lights up a screen, automatically hides a secure-lock unlocking interface to display a call interface, and reminds the user of call information, such as a called party or a call number. If the call information is incorrect, the user may directly abort a call process by means of voice or by tapping a call hang-up button. In an entire procedure for starting a voice service, the user requires only one time of button pressing and one time of voice instruction input.

After the user finishes the call, that is, the voice service provided by the smartphone for the user is complete, the device in the background of the smartphone stops recording, and the smartphone still displays the secure-lock unlocking interface. During a period of calling and conversation, personal information of the user, such as address book data and personal information that is stored on the mobile phone, is still protected by a secure lock.

According to the method for quickly starting an application service provided in this embodiment of the present disclosure, a user inputs a button startup event to a terminal, so that the terminal acquires event trigger information according to the button startup event, and starts application service software after determining that the event trigger information meets a preset quick startup condition, so as to provide an application service for the user. According to the method provided in this embodiment of the present disclosure, application service software is started by using event trigger information, so that a background of a terminal starts to perform recording only after the application service software is started, and background recording is stopped after the terminal provides an application service for a user, preventing a recording device in the background of the terminal from being always in a recording state, and further reducing power consumption of the terminal. In addition, according to the method provided in this embodiment of the present disclosure, a user does not need to light up a screen or unlock a screen, but only needs to perform one button-pressing operation and input one voice instruction, so that a terminal can provide a corresponding application service, which is easy to operate, thereby improving manipulation efficiency and enhancing user experience.

Figure 4:
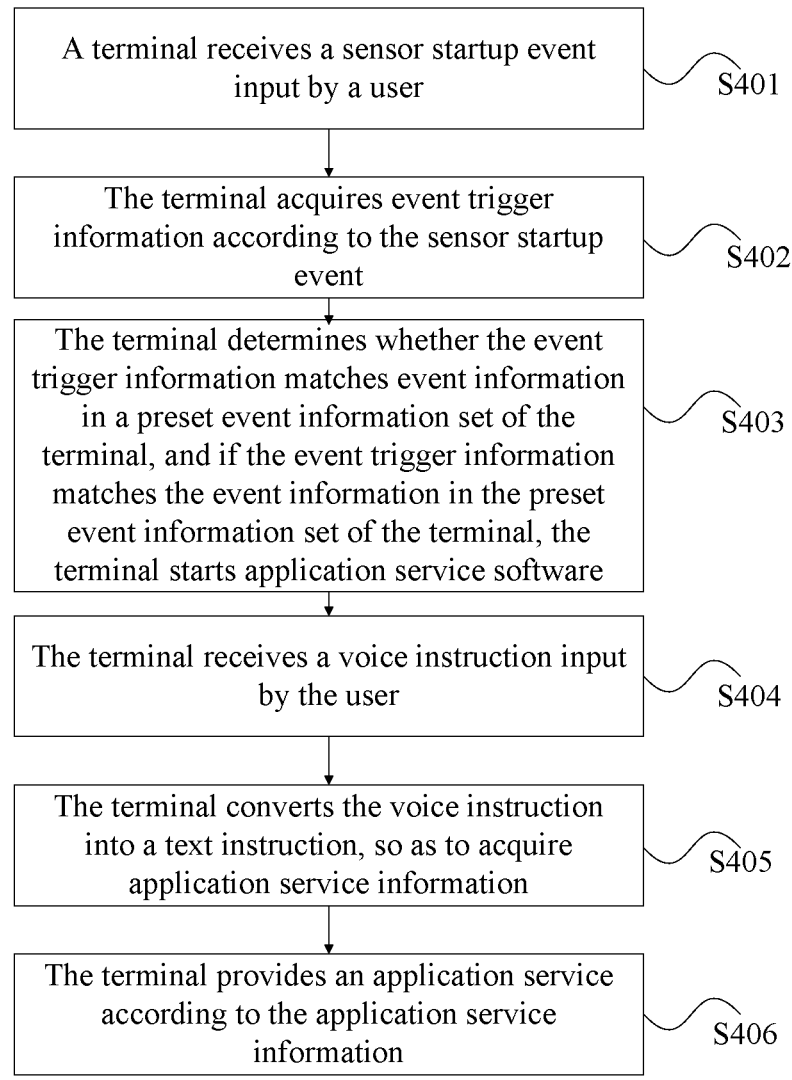
FIG. 4 is a schematic flowchart of Embodiment 4 of a method for quickly starting an application service according to the present disclosure.

FIG. 4 is a schematic flowchart of Embodiment 4 of a method for quickly starting an application service according to the present disclosure. The method involved in this embodiment is a process in which a user starts application service software on a terminal by using a sensor startup event, so that the terminal provides a corresponding application service for the user. As shown in FIG. 4, the method may include the following steps.

S401. A terminal receives a sensor startup event input by a user. When the user needs to quickly start an application service on the terminal, the user may perform a sensing operation on the terminal, and input the sensor startup event to the terminal by using the sensing operation, that is, the terminal may acquire the sensor startup event by sensing a gesture of the user. For example, it is assumed that the terminal is a smartphone, the sensor startup event of the user may be that the user holds an earpiece near an ear of the user, may further be another event that the user quickly swings the smartphone and then stops, and the like.

S402. The terminal acquires event trigger information according to the sensor startup event. It should be noted that when the terminal is in a black screen state with a running AP, the terminal may directly acquire the event trigger information according to the sensor startup event of the user. When the terminal is in a black screen state with a standby AP, after receiving the sensor startup event of the user, the terminal needs to power on the AP to activate the AP, and then can acquire the event trigger information according to the sensor startup event. Optionally, the sensor startup event input by the user may further be combined with the button startup event in the foregoing Embodiment 2, so that the terminal acquires the event trigger information.

S403. The terminal determines whether the event trigger information matches event information in a preset event information set of the terminal, and if the event trigger information matches the event information in the preset event information set of the terminal, the terminal starts the application service software. When the terminal is in the black screen state with a running AP, after acquiring the event trigger information, the terminal directly performs encapsulation and classification processing on the event trigger information. When the terminal is in the black screen state with a standby AP, the terminal needs to perform self-test recovery on the AP after the AP is powered on, and the terminal performs encapsulation and classification processing on the acquired event trigger information only after it is detected that a status of the AP is normal.

Encapsulation and classification processing performed by the terminal on the event trigger information is actually determining a type of the event trigger information by the terminal. When the terminal determines that the type of the event trigger information is a sensor startup event, the terminal determines, according to the type of the event trigger information, that a quick startup condition corresponding to the event trigger information is whether the event trigger information matches the event information in the preset event information set (the preset event information set of the terminal includes multiple pieces of event information). Optionally, the preset information set may be stored in a form of an entry, or may also be stored in a form of an information base, which is not limited in this embodiment of the present disclosure. If the event trigger information matches the event information in the preset event information set, the terminal starts the application service software. Optionally, when the user inputs a different sensor startup event to the terminal, it indicates that the user needs to start different application service software. For example, if the user currently wants to start a voice service, the user holds the earpiece of the mobile phone near the ear, and the event trigger information obtained by the terminal according to the sensor startup event is information about voice service software. If the user currently wants to start a short messaging service, the user swings the mobile phone, and the event trigger information obtained by the terminal according to the sensor startup event is information about short messaging service software. That is, a sensing operation performed by the user (that is, a sensor startup event input by the user), event trigger information acquired by the terminal according to the sensing operation performed by the user, and an application service software that needs to be started are corresponding to one another.

S404. The terminal receives the voice instruction input by the user. After starting the application service software, the terminal may receive voice input of the user. Accordingly, a recording device in a background starts recording at this time. Optionally, after starting the application service software, the terminal may notify, in a manner of vibrating or playing an alert tone, the user that the voice instruction can be currently input.

S405. The terminal converts the voice instruction into a text instruction, so as to acquire application service information. After receiving the voice instruction input by the user, the terminal converts the voice instruction into the text instruction according to the voice instruction input by the user, so as to acquire the application service information related to the voice instruction.

S406. The terminal provides the application service according to the application service information. In an implementation manner of this embodiment of the present disclosure, the terminal may perform an operation of quickly making a call. Optionally, the terminal is a mobile phone. Optionally, the terminal is in a black screen state with a running AP. Optionally, the terminal is in a screen locked state.

The user starts application service software by performing a sensing operation on the smartphone. That is, the user performs one sensing operation on the smartphone. For example, the user holds an earpiece of the smartphone near the ear, so as to input a sensor startup event to the smartphone. Related hardware of the smartphone responds to the sensor startup event of the user, that is, the smartphone first powers on the AP to activate the AP, and then converts the sensor startup event of the user into event trigger information that includes information such as a signal and data, and reports the event trigger information to an operating system of the smartphone. After receiving the event trigger information, the operating system of the smartphone first performs self-test recovery on the AP, and after a status of the AP is normal, encapsulation and classification processing is performed on the event trigger information, that is, a quick startup condition corresponding to the event trigger information (that is, whether the event trigger information matches event information in a preset event information set of the smartphone) is determined, and after it is determined that the event trigger information matches the event information in the preset event information set of the smartphone, voice service software is started.

A device in a background of the smartphone starts to perform recording only after the smartphone starts the voice service software, so as to receive voice instruction input of the user. In this case, the voice service software may notify, in a manner of playing an alert tone or vibrating, the user that a voice instruction for making a call, such as "redial", "call XXX", or "make a call to XXX", can be input, where "XXX" is a name of a contact. A speech recognition system in the smartphone converts the received voice instruction into a text instruction, and then acquires application service information (that is, call information) according to the text instructions. For example, if the voice instruction is "redial", the application service information finally acquired by the smartphone is a call number last time; if the voice instruction is "call XXX", the application service information finally acquired by the smartphone is a number of XXX.

After the smartphone obtains the application service information, a quick call system of the smartphone starts a call service. In this case, the smartphone automatically lights up a screen, automatically hides a secure-lock unlocking interface to display a call interface, and reminds the user of call information, such as a called party or a call number. If the call information is incorrect, the user may directly abort a call process by means of voice or by tapping a call hang-up button. In an entire procedure for starting a voice service, the user requires only one sensing operation and one time of voice instruction input.

After the user finishes the call, that is, the voice service provided by the smartphone for the user is complete, the device in the background of the terminal stops recording, and the smartphone still displays the secure-lock unlocking interface. During a period of calling and conversation, personal information of the user, such as address book data and personal information that is stored on the mobile phone, is still protected by a secure lock.

According to the method for quickly starting an application service provided in this embodiment of the present disclosure, a user inputs a sensor startup event to a terminal, so that the terminal acquires event trigger information according to the sensor startup event, and starts application service software after determining that the event trigger information meets a preset quick startup condition, so as to provide an application service for the user. According to the method provided in this embodiment of the present disclosure, application service software is started by using event trigger information, so that a background of a terminal starts to perform recording only after the application service software is started, and background recording is stopped after the terminal provides an application service for a user, preventing a recording device in the background of the terminal from being always in a recording state, and further reducing power consumption of the terminal. In addition, according to the method provided in this embodiment of the present disclosure, a user does not need to light up a screen or unlock a screen, but only needs to perform one sensing operation and input one voice instruction, so that a terminal can provide a corresponding application service, which is easy to operate, thereby enhancing user experience.

Persons of ordinary skill in the art may understand that all or a part of the steps of the foregoing method embodiments may be implemented by a program instructing relevant hardware. The program may be stored in a computer readable storage medium. When the program runs, the steps of the foregoing method embodiments are performed. The foregoing storage medium includes any medium that can store program code, such as a read only memory (ROM), a random access memory (RAM), a magnetic disk, or an optical disc.

Figure 5:
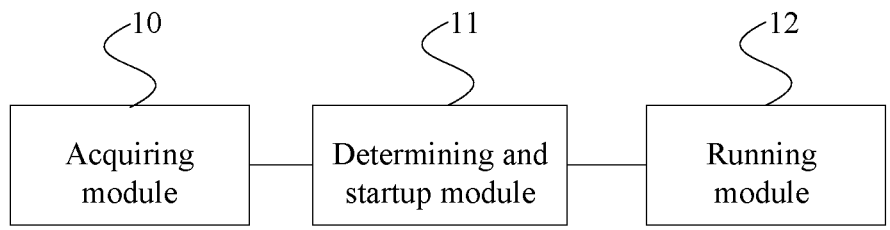
FIG. 5 is a schematic structural diagram of Embodiment 1 of a terminal according to the present disclosure.

FIG. 5 is a schematic structural diagram of Embodiment 1 of a terminal according to the present disclosure. As shown in FIG. 5, the terminal includes an acquiring module 10, a determining and startup module 11, and a running module 12. The acquiring module 10 is configured to acquire event trigger information, where the event trigger information is used to start application service software on the terminal. The determining and startup module 11 is configured to start the application service software after it is determined that the event trigger information meets a preset quick startup condition. The running module 12 is configured to acquire a voice instruction input by a user, and run the application service software according to the voice instruction.

The terminal provided in this embodiment of the present disclosure can execute the foregoing method embodiments for quickly starting an application service. Implementation principles and technical effects of the terminal are similar, and details are not described herein again.

Further, the application service software is dial-up application software, the acquiring module 10 is configured to acquire the event trigger information, and the event trigger information is used to start the dial-up application software; and the running module 12 is configured to acquire the voice instruction input by the user, and run the dial-up application software according to the voice instruction.

Further, the acquiring module 10 is configured to acquire the event trigger information in a black screen state, and the running module 12 is configured to acquire, in the black screen state, the voice instruction input by the user, and run the application service software according to the voice instruction.

Figure 6:
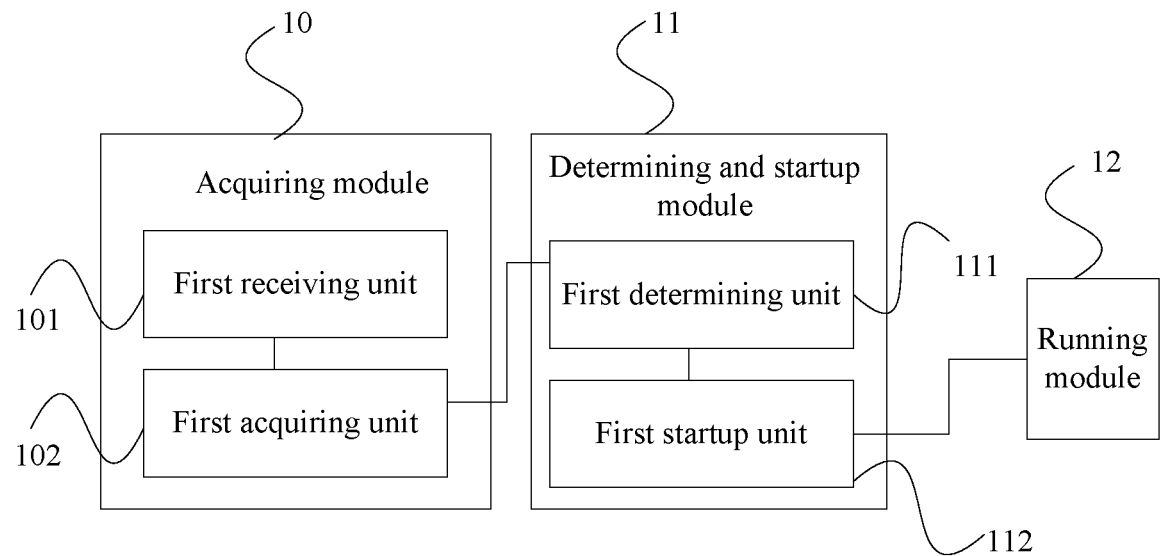
FIG. 6 is a schematic structural diagram of Embodiment 2 of a terminal according to the present disclosure.

FIG. 6 is a schematic structural diagram of Embodiment 2 of a terminal according to the present disclosure. On the basis of the foregoing embodiment shown in FIG. 5, further, the acquiring module 10 includes a first receiving unit 101 configured to receive a button startup event that is input by the user by performing an operation on a physical button, and a first acquiring unit 102 configured to acquire the event trigger information according to the button startup event. The determining and startup module 11 includes a first determining unit 111 configured to determine whether a trigger time of the button startup event is greater than a preset threshold, and a first startup unit 112 configured to start the application service software when the first determining unit 111 determines that the trigger time of the button startup event is greater than the preset threshold.

The terminal provided in this embodiment of the present disclosure can execute the foregoing method embodiments for quickly starting an application service. Implementation principles and technical effects of the terminal are similar, and details are not described herein again.

Figure 7:
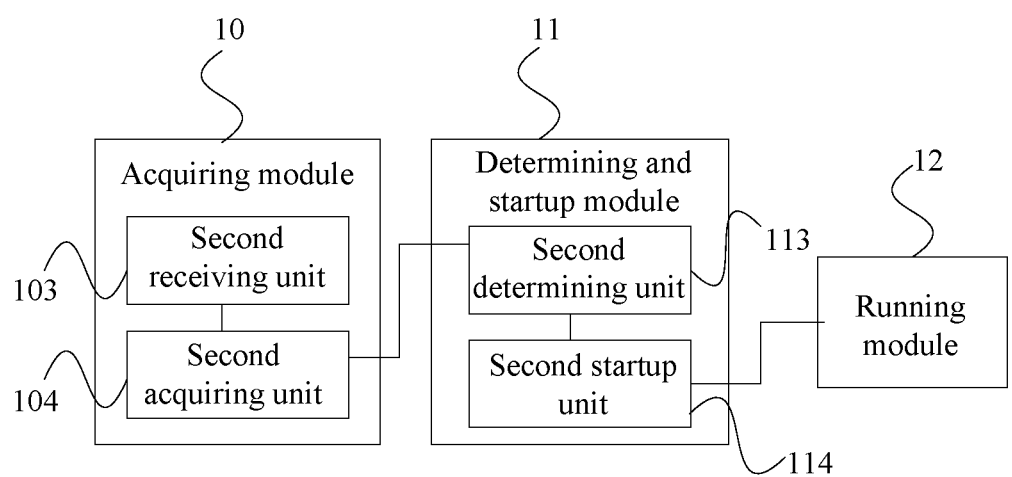
FIG. 7 is a schematic structural diagram of Embodiment 3 of a terminal according to the present disclosure.

FIG. 7 is a schematic structural diagram of Embodiment 3 of a terminal according to the present disclosure. On the basis of the foregoing embodiment shown in FIG. 5, further, the acquiring module 10 may further include a second receiving unit 103 configured to receive a sensor startup event input by the user, and a second acquiring unit 104 configured to acquire the event trigger information according to the sensor startup event. The determining and startup module 11 further includes a second determining unit 113 configured to determine whether the event trigger information matches event information in a preset event information set of the terminal, and a second startup unit 114 configured to start the application service software when the second determining unit 113 determines that the event trigger information matches the event information in the preset event information set of the terminal.

Figure 8:
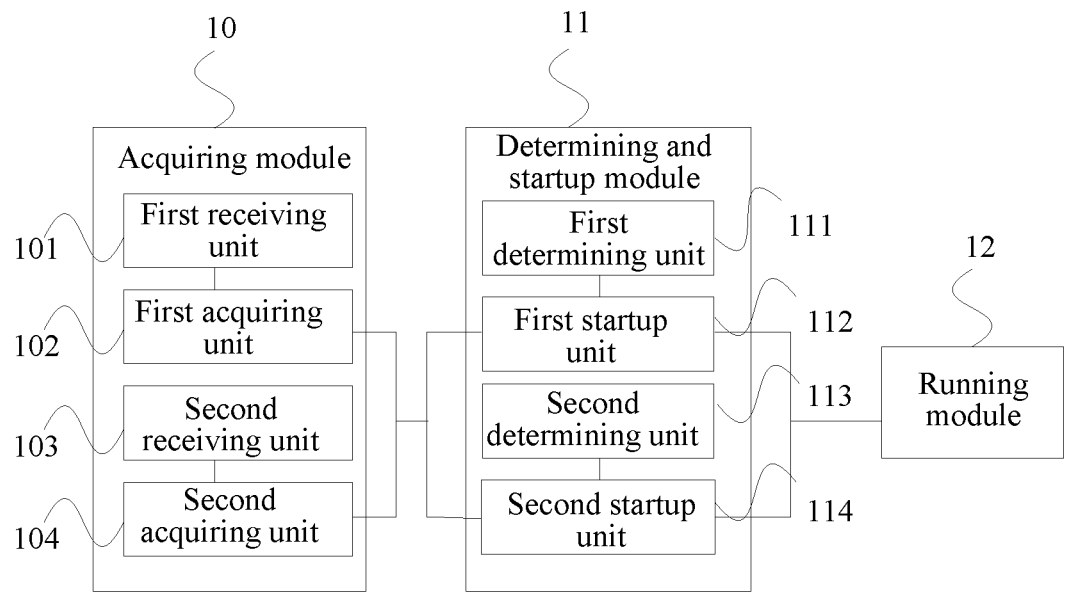
FIG. 8 is a schematic structural diagram of Embodiment 4 of a terminal according to the present disclosure.

Optionally, in Embodiment 4 of a terminal shown in FIG. 8, the first receiving unit 101 and the first acquiring unit 102 shown in FIG. 6 and the second receiving unit 103 and the second acquiring unit 104 in FIG. 7 may be all integrated into the acquiring module 10; and the first determining unit 111 and the first startup unit 112 in FIG. 6 and the second determining unit 113 and the second startup unit 114 in FIG. 7 may be all integrated into the determining and startup module 11. The first receiving unit 101, the first acquiring unit 102, the first determining unit 111, and the first startup unit 112 function in a collaborative manner in a button startup scenario. The second receiving unit 103, the second acquiring unit 104, the second determining unit 113, and the second startup unit 114 function in a collaborative manner in a sensor startup scenario.

The terminal provided in this embodiment of the present disclosure can execute the foregoing method embodiments for quickly starting an application service. Implementation principles and technical effects of the terminal are similar, and details are not described herein again.

Figure 9:
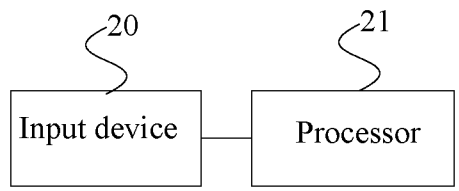
FIG. 9 is a schematic structural diagram of Embodiment 5 of a terminal according to the present disclosure.

FIG. 9 is a schematic structural diagram of Embodiment 5 of a terminal according to the present disclosure. As shown in FIG. 9, the terminal includes an input device 20 and a processor 21. The input device 20 is configured to acquire event trigger information, where the event trigger information is used to start application service software on the terminal; and configured to acquire a voice instruction input by a user. The processor 21 is configured to start the application service software after it is determined that the event trigger information meets a preset quick startup condition, and run the application service software according to the voice instruction acquired by the input device 20.

The terminal provided in this embodiment of the present disclosure can execute the foregoing method embodiments for quickly starting an application service. Implementation principles and technical effects of the terminal are similar, and details are not described herein again.

Further, the application service software is dial-up application software, the input device 20 is configured to acquire the event trigger information, the event trigger information is used to start the dial-up application software, and the input device 20 is further configured to acquire the voice instruction input by the user. The processor 21 is configured to run the dial-up application software according to the voice instruction after the input device 20 acquires the voice instruction input by the user.

Figure 10:
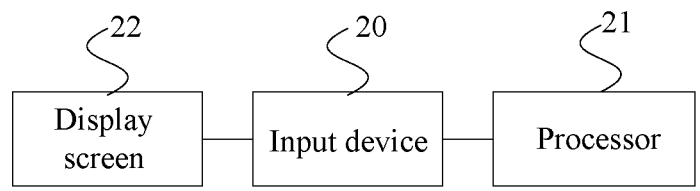
FIG. 10 is a schematic structural diagram of Embodiment 6 of a terminal according to the present disclosure.

FIG. 10 is a schematic structural diagram of Embodiment 6 of a terminal according to the present disclosure. On the basis of the foregoing embodiment shown in FIG. 9, further, the terminal further includes a display screen 22. The input device 20 is configured to acquire the event trigger information in a black screen state of the display screen 22, and configured to acquire, in the black screen state of the display screen 22, the voice instruction input by the user. The processor 21 is configured to run the application service software according to the voice instruction acquired by the input device 20. Optionally, in an implementation manner of this embodiment of the present disclosure, the display screen 22 may also be a touchscreen, and the touchscreen may be an exemplary form of the input device 20. That is, the display screen 22 may integrate an output function and an input function. In this case, that the input device 20 is configured to acquire the event trigger information in the black screen state of the display screen 22 may include acquiring, by the input device 20, the event trigger information in a black screen state of the touchscreen.

Optionally, the input device 20 is configured to receive a button startup event that is input by the user by performing an operation on a physical button, and acquire the event trigger information according to the button startup event. The processor 21 is configured to determine whether a trigger time of the button startup event is greater than a preset threshold, and if yes, start the application service software.

Figure 11:
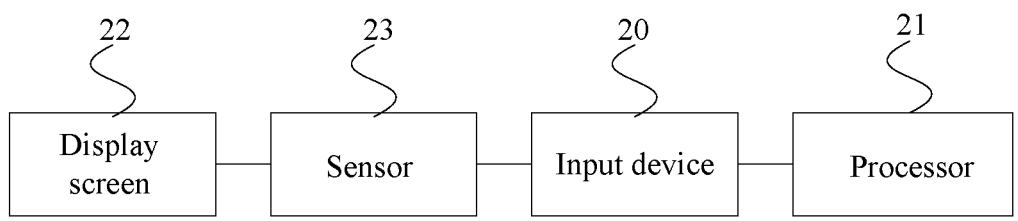
FIG. 11 is a schematic structural diagram of Embodiment 7 of a terminal according to the present disclosure.

Optionally, referring to Embodiment 7 of a terminal shown in FIG. 11, on the basis of the embodiment shown in FIG. 10, the terminal may further include a sensor 23. The input device 20 is configured to receive a sensor startup event that is input by the user by using the sensor 23, and acquire the event trigger information according to the sensor startup event. The processor 21 is configured to determine whether the event trigger information matches event information in a preset event information set of the terminal, and if the event trigger information matches the event information in the preset event information set of the terminal, start the application service software. Optionally, in an implementation manner of this embodiment of the present disclosure, the sensor 23 may be an exemplary form of the input device 20. That is, the sensor 23 receives the sensor startup event input by the user, and acquires the event trigger information according to the sensor startup event.

The terminal provided in this embodiment of the present disclosure can execute the foregoing method embodiments for quickly starting an application service. Implementation principles and technical effects of the terminal are similar, and details are not described herein again.

It should be noted that in all the foregoing embodiments of the present disclosure, for same or corresponding technical features, reference may be made to each other.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A terminal, comprising:
   a processor;
   a physical button coupled to the processor;
   a display screen coupled to the processor; and
   a non-transitory memory coupled to the processor and configured to store instructions, wherein the processor is configured to execute the instructions to cause the terminal to:
   display, on the display screen, a lock screen interface indicating that the terminal is in a locked state;
   receive a press down operation of the physical button while displaying the lock screen interface;
   start a voice service application when a duration of the press down operation reaches a preset threshold;
   provide a vibration prompting a user to input a voice instruction to the voice service application;
   receive a voice input from the user;
   convert the voice input into a text instruction by a voice recognition function of the terminal;
   obtain a last-called number when the text instruction indicates a redial command;
   launch a call service and make a call to a remote device associated with the last-called number;
   display a call interface comprising the last-called number while the terminal is in the locked state;
   display the lock screen interface after ending the call to the remote device; and
   prevent the user from accessing user information stored on the terminal by maintaining the terminal in the locked state while making the call to the remote device, while displaying the last-called number, during the call with the remote device, and while displaying the lock screen interface,
wherein user information stored on the terminal is protected by a secure lock when the terminal is in the locked state.

2. The terminal of claim 1, wherein the physical button is a volume down button or a power button.

3. The terminal of claim 1, wherein the instructions further cause the terminal to hide the lock screen interface when displaying the call interface comprising the last-called number.

4. The terminal of claim 1, wherein the instructions further cause the terminal to run a recording function in a background in response to starting the voice service application.

5. The terminal of claim 4, wherein the instructions further cause the terminal to stop the recording function in the background in response to ending the call to the remote device.

6. A method of starting a voice service application on a terminal with a display screen, comprising:
receiving, by the terminal when the display screen is in a locked state and in a screen-on state, a first operation from a user via a physical button of the terminal being held down, wherein the locked state protects personal information in the terminal by a secure lock, and wherein the screen-on state comprises the display screen being powered-on;
starting the voice service application when a trigger time of the physical button being held down is greater than a preset threshold;
providing a vibration prompting the user to input a voice instruction;
receiving, by the terminal when the display screen is in the screen-on state, the voice instruction, wherein the voice instruction comprises information associated with contact information stored in the terminal;
hiding a lock screen interface and automatically dialing a remote device associated with the contact information while the display screen is in the locked state, wherein the lock screen interface locks the display screen when the display screen is in the screen-on state;
displaying the contact information on the display screen while the display screen continues to be in the locked state;
keeping the display screen in the locked state during a call with the remote device;
displaying the lock screen interface to indicate that the display screen is in the locked state after ending the call to the remote device; and
preventing the user from accessing personal information stored on the terminal by maintaining the display screen in the locked state while automatically dialing the remote device, while displaying the contact information, during the call with the remote device, and while displaying the lock screen interface.

7. The method of claim 6, further comprising:
receiving tapping on a call hang-up button on the terminal; and
aborting the dialing in response to the tapping.

8. The method of claim 7, wherein after aborting the dialing, the method further comprises displaying the lock screen interface.

9. The method of claim 6, wherein the contact information comprises a name of a called party.

10. The method of claim 9, wherein the contact information further comprises a call number.

11. The method of claim 6, further comprising running a recording function in a background in response to starting the voice service application.

12. The method of claim 11, further comprising stopping the recording function after the terminal terminates the call.

13. The method of claim 6, wherein the physical button is a volume down button or a power button.

14. The method of claim 6, wherein notifying the user to input the voice instruction comprises notifying the user by playing an alert tone.

15. A terminal, comprising:
a display screen;
an input device configured to receive a first operation from a user via a physical button of the terminal being held down when the display screen is in a locked state and a screen-on state, wherein the locked state protects personal information in the terminal by a secure lock, and wherein the screen-on state comprises the display screen being powered-on;
a memory comprising instructions; and
a processor coupled to the display screen, the input device, and the memory, wherein the instructions cause the processor to be configured to:
start a voice service application when a trigger time of the physical button being held down is greater than a preset threshold;
provide a vibration prompting the user to input a voice instruction;
receive, in the screen-on state of the display screen, the voice instruction, wherein the voice instruction comprises information associated with contact information;
hide a lock screen interface and automatically dial a remote device associated with the contact information stored on the terminal while the display screen is in the locked state, wherein the lock screen interface locks the display screen when the display screen is in the screen-on state;
display the contact information on the display screen while the display screen continues to be in the locked state;
keep the display screen in the locked state during a call with the remote device;
display the lock screen interface to indicate that the display screen is in the locked state after ending the call to the remote device; and
prevent the user from accessing personal information stored on the terminal by maintaining the display screen in the locked state while automatically dialing the remote device, while displaying the contact information, during the call with the remote device, and while displaying the lock screen interface.

16. The terminal of claim 15, further comprising an output device coupled to the processor and configured to notify the user to input the voice instruction by playing an alert tone.

17. The terminal of claim 15, wherein the input device is further configured to receive a second operation comprising tapping a call hang-up button on the terminal, and wherein the instructions further cause the processor to be configured to abort the call to the remote device in response to receiving the second operation at the input device.

18. The terminal of claim 15, wherein the instructions further cause the processor to be configured to display the lock screen interface after aborting the call.

19. The terminal of claim 15, wherein the contact information comprises a name of a called party and a call number.

20. The terminal of claim 15, wherein the physical button is a volume down button or a power button.

\* \* \* \* \*